(12) United States Patent
Chasteau et al.

(10) Patent No.: US 12,337,997 B2
(45) Date of Patent: Jun. 24, 2025

(54) PINTLE SUPPORT AND METHOD OF INSTALLING A LANDING GEAR ASSEMBLY

(71) Applicant: Airbus Operations Limited, Bristol (GB)

(72) Inventors: Dominique Chasteau, Bristol (GB); Guilherme Barsali, Bristol (GB); James Barnes, Bristol (GB); Christopher James Perkins, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/619,590

(22) Filed: Mar. 28, 2024

(65) Prior Publication Data
US 2024/0327037 A1 Oct. 3, 2024

(30) Foreign Application Priority Data

Mar. 31, 2023 (GB) ...................................... 2304836

(51) Int. Cl.
*B64F 5/10* (2017.01)
*B64C 25/04* (2006.01)

(52) U.S. Cl.
CPC ............... *B64F 5/10* (2017.01); *B64C 25/04* (2013.01)

(58) Field of Classification Search
CPC ............ B64F 5/10; B64C 25/04; B64C 25/10
See application file for complete search history.

(56) References Cited

U.S. PATENT DOCUMENTS

| | | | | |
|---|---|---|---|---|
| 2,484,900 | A * | 10/1949 | McPherson | B64C 25/16 244/102 R |
| 4,445,657 | A * | 5/1984 | Breckenridge | A01M 7/0053 248/74.1 |
| 7,416,156 | B2 | 8/2008 | Hinton | |
| 7,967,245 | B2 * | 6/2011 | Seror-Goguet | B64C 25/26 244/102 SL |
| 9,643,738 | B2 * | 5/2017 | DesJardien | B64F 5/50 |
| 10,112,699 | B2 * | 10/2018 | Simonneaux | B64F 5/10 |
| 2007/0110552 | A1 * | 5/2007 | Groves | B66F 7/22 414/589 |

(Continued)

FOREIGN PATENT DOCUMENTS

| | | | | |
|---|---|---|---|---|
| CN | 102745340 | A * | 10/2012 | |
| CN | 109080850 | A * | 12/2018 | B64F 5/10 |

(Continued)

OTHER PUBLICATIONS

British Search Report for Application No. 22078224 dated Nov. 23, 2022.

(Continued)

*Primary Examiner* — Bayan Salone
(74) *Attorney, Agent, or Firm* — KDW Firm PLLC

(57) ABSTRACT

A temporary pintle support which can attach between upper prongs of a landing gear, and which is arranged to hold pintle pins prior to installation of the landing gear assembly at an aircraft. The pintle support is attached at the landing gear to align the pintle pins with their respective attachment bearings on each of the prongs. The pintle support may be removed once the pintle pins are fully inserted.

16 Claims, 5 Drawing Sheets

(56) References Cited

U.S. PATENT DOCUMENTS

| | | | | |
|---|---|---|---|---|
| 2010/0119343 | A1* | 5/2010 | Groves | B66F 7/14 |
| | | | | 414/590 |
| 2011/0138574 | A1* | 6/2011 | Bogue | B64D 29/06 |
| | | | | 29/402.09 |
| 2013/0099052 | A1* | 4/2013 | Gleyze | B64F 5/60 |
| | | | | 244/100 R |
| 2015/0251750 | A1* | 9/2015 | Cook | B64C 25/04 |
| | | | | 29/434 |
| 2015/0314861 | A1* | 11/2015 | Paddock | B64C 25/26 |
| | | | | 244/102 A |
| 2017/0050830 | A1* | 2/2017 | Podnar | B66F 9/07568 |
| 2017/0106972 | A1 | 4/2017 | Sobajima | |
| 2017/0206972 | A1* | 7/2017 | Nakayama | G11C 16/30 |
| 2018/0029697 | A1* | 2/2018 | Ditzler | B64C 25/26 |
| 2018/0362150 | A1 | 12/2018 | Sakota | |
| 2019/0218840 | A1* | 7/2019 | Hacault | E05D 3/02 |
| 2019/0300142 | A1* | 10/2019 | Helsley | B64C 1/1407 |
| 2021/0394556 | A1* | 12/2021 | Winters | B60B 30/04 |
| 2022/0009620 | A1* | 1/2022 | Perkins | B64C 25/04 |
| 2022/0048614 | A1* | 2/2022 | McMahon | B64C 25/04 |

FOREIGN PATENT DOCUMENTS

| | | | | |
|---|---|---|---|---|
| CN | 109720555 | A * | 5/2019 | |
| CN | 209938997 | | 1/2020 | |
| CN | 210391588 | | 4/2020 | |
| CN | 212172576 | | 12/2020 | |
| CN | 112960111 | A | 6/2021 | |
| CN | 113428809 | A | 9/2021 | |
| CN | 215707227 | | 2/2022 | |
| CN | 215798268 | | 2/2022 | |
| CN | 112960111 | B * | 5/2024 | B64C 1/1461 |
| EP | 0597688 | A1 | 5/1994 | |
| EP | 3476714 | A1 * | 5/2019 | B64C 1/12 |
| EP | 3814232 | B1 * | 4/2022 | B64F 5/10 |
| GB | 624831 | A | 6/1949 | |
| GB | 2417933 | A * | 3/2006 | B64C 25/00 |
| GB | 2619074 | A * | 11/2023 | B64C 25/00 |
| GB | 2619553 | A * | 12/2023 | B64C 1/1407 |
| JP | 2007154983 | A * | 6/2007 | |
| JP | 2017077741 | A | 4/2017 | |
| KR | 101749982 | B1 | 6/2017 | |
| WO | 2005096721 | A2 | 10/2005 | |
| WO | 2016077122 | A1 | 5/2016 | |
| WO | WO-2020260267 | A1 * | 12/2020 | B64C 25/04 |

OTHER PUBLICATIONS

British Search Report for Application No. 22085138 dated Dec. 13, 2022.
British Search Report for Application No. 23048366 dated Sep. 11, 2023.
British Search Report for Application No. 23048390 dated Sep. 13, 2023.
British Search Report for Application No. 23048283 dated Sep. 14, 2023.
British Search Report for Application No. 23048309 dated Sep. 15, 2023.
British Search Report for Application No. 23048317 dated Sep. 22, 2023.
European Search Report for Application No. 23175515 dated Oct. 5, 2023.
European Search Report for Application No. 231781329 dated Nov. 2, 2023.
British Search Report for Application No. 23048390 dated Feb. 14, 2024.
British Search Report for Application No. 23048283 dated Feb. 15, 2024.
Extended European Search Report issued in EP Application No. 24165675, dated Sep. 10, 2024, 7 pages.

* cited by examiner

PINTLE SUPPORT AND METHOD OF INSTALLING A LANDING GEAR ASSEMBLY

TECHNICAL FIELD

The disclosure herein relates to the installation of aircraft landing gear assemblies. More particularly, but not exclusively, this disclosure herein concerns pintle support arrangements for inserting pintle pins during installation of aircraft landing gear assemblies.

BACKGROUND

FIG. 1 *a* shows an aircraft 101 having landing gear door components 110 including landing gear doors and door fairings in a closed configuration, with the associated landing gear assemblies (not shown) retracted in their respective landing gear bays.

FIG. 1*b* shows a portion of the aircraft 101 with a landing gear bay 130 and a landing gear assembly, in the form of a main landing gear (MLG) assembly 120, together with associated components in an extended configuration. During extension and retraction, the MLG 120 pivots on forward and aft pintle bearings 125 and 130 respectively.

A new MLG assembly is typically supplied from a component manufacturer together with forward and aft pintle pins. As shown in FIG. 2, the MLG assembly 120 has a forward pintle pin 210 which is shown already attached to the forward pintle bearing 125. An aft pintle pin 220 is ready to be fitted to the aft pintle bearing 130 when the MLG 120 is in position and correctly aligned with the airframe.

During installation of the MLG assembly 120, the diameter of each pintle pin must first be checked by inserting it in the corresponding airframe location. Furthermore bushes, bearings and the pintle pins themselves must be greased. Finally, the MLG assembly 120 must be carefully aligned with the airframe so that the forward and aft pintle pins 210 and 220 respectively can be inserted through the forward and aft pintle bearings 125 and 130 respectively to attach the MLG assembly 120 to the airframe. Therefore, the process of installing a landing gear assembly is generally slow, complex and/or inefficient.

The disclosure herein seeks to mitigate one or more of the above-mentioned problems. Alternatively or additionally, the disclosure herein seeks to provide an improved landing gear assembly, and/or pintle support, and/or method of installing a landing gear on an aircraft.

SUMMARY

In a first aspect, the disclosure herein provides a removable pintle support adapted to engage with a landing gear assembly so as to be supported by the landing gear assembly and to support at least one pintle pin in a predetermined position with respect to at least one orifice of the landing gear assembly during installation of the landing gear assembly to an aircraft.

In this way the pintle pin(s) may be prepared and held securely in a required position at the landing gear assembly prior to the latter being fitted at the aircraft, by virtue of the pintle support. Preparation may include cleaning, greasing, and verifying the diameter of the pintle pin(s) with respect to the attachment orifice. The landing gear assembly may therefore be brought to the aircraft and placed in position for attachment, without any further preparatory actions needing to be taken for insertion of the pintle pin(s) at the point of assembly.

Preferably the predetermined position is adjacent at least one orifice of the landing gear assembly, and the pintle support is arranged to support the at least one pintle pin in alignment with the at least one orifice.

Preferably the pintle support is adapted to support the or each pintle pin for insertion into, and/or with at least one of the pins partially inserted in, the or each respective orifice, with the pintle support engaged with the landing gear assembly. The pintle support allows at least one pintle pin to be partially inserted in the at least one orifice when the pintle support is engaged with the landing gear assembly. Such partial insertion of the at least one pintle pin facilitates the provision of further security of position, in terms of the correct alignment of the pintle pin(s) with the attachment orifice(s), and/or facilitates a reduction in the likelihood of the pintle pin(s) becoming detached from the pintle support.

Preferably the pintle support is arranged to support forward and aft pintle pins in alignment with forward and aft orifices of the landing gear assembly respectively. The forward and aft orifices may be associated with different elements of the landing gear assembly, such as prongs of a main leg assembly of the landing gear assembly.

The pintle support is preferably arranged to be engaged with the landing gear assembly between the forward and aft orifices of the landing gear assembly. The pintle support may therefore be attached to the landing gear assembly between the prongs of the main leg assembly. In such arrangements the forward and aft pintle pins may be held at opposite ends of the pintle support.

Preferably the pintle support is adapted to support the forward and/or aft pintle pins for insertion into, and/or with at least one of the pins partially inserted in, the forward and/or aft orifices respectively, with the pintle support engaged with the landing gear assembly. Partial insertion of the forward and aft pintle pins facilitates the provision of further security of position, in terms of the correct alignment of the pintle pins with the forward and aft orifices, as well as reducing the likelihood of the forward and aft pintle pins becoming detached from the pintle support.

The pintle support is preferably fabricated from one of cardboard and plastics material.

After installation of the landing gear assembly, the pintle support is preferably available for use with another landing gear assembly to be installed at an aircraft. In this way the pintle support is reusable.

The pintle support preferably is shaped to cradle the or each respective pintle pin, to thereby facilitate the provision of positional stability and/or protection from contamination and surface damage. The pintle support may be provided separately from the landing gear assembly with which it is to be used. The pintle support may be located in situ with the landing gear assembly so that the pintle support engages with, and is supported by, the landing gear assembly. The pintle support may be provided separately from the pintle pin with which it is to be used. The pintle support may be located in situ with the at least one pintle pin, such that for example the pintle support supports the pintle pin. In use, the pintle support engages with, and is supported by, the landing gear assembly and supports the at least one pintle pin in the predetermined position with respect to the at least one orifice of the landing gear assembly. The removable pintle support may be provided with the at least one pintle pin and/or the landing gear assembly, as a kit of parts.

According to a second aspect of the disclosure herein, there is provided a landing gear assembly adapted to engage and support a removable pintle support in a predetermined position relative to the landing gear assembly, thereby to support at least one pintle pin in a predetermined position with respect to at least one pintle orifice of the landing gear assembly.

Preferably the landing gear assembly comprises an engager comprising at least one protruding member adapted to engage and support the pintle support in its predetermined position, thereby to support the or each pintle pin in alignment with the or each respective pintle orifice.

Alternatively, the landing gear assembly preferably includes an engager comprising at least one recess adapted to engage and support the pintle support in its predetermined position, thereby to support the or each pintle pin in alignment with the or each respective pintle orifice.

According to a further aspect of the disclosure herein, a method of installing a landing gear assembly at an aircraft is provided. The method comprises: engaging a pintle support to the landing gear assembly so that the pintle support is supported in a predetermined position relative to an orifice of the landing gear assembly; placing a pintle pin on the pintle support in alignment with the orifice; positioning the landing gear assembly at a landing gear fixing of the aircraft with the orifice of the landing gear assembly in alignment with the landing gear fixing; inserting the pintle pin into the orifice and the landing gear fixing in order to attach the landing gear assembly to the aircraft; and removing the pintle support from the landing gear assembly.

In this way the pintle support provides alignment of the at least one pintle pin prior to installation of the landing gear assembly.

It may be that the inserting of the pintle pin into the orifice of the landing gear assembly is performed prior to positioning the landing gear assembly at the landing gear fixing of the aircraft. The method preferably further comprises: engaging the pintle support to the landing gear assembly so that the pintle support is supported in a predetermined position relative to a further orifice of the landing gear assembly; placing a further pintle pin on the pintle support in alignment with the further orifice; positioning the landing gear assembly at a landing gear fixing of the aircraft with both the orifice and the further orifice of the landing gear assembly in alignment with the landing gear fixing; and inserting the pintle pin and the further pintle pin into the orifice and the further orifice respectively, and into the landing gear fixing in order to attach the landing gear assembly to the aircraft.

The method preferably further comprises, prior to positioning the landing gear assembly at the landing gear fixing of the aircraft, inserting the further pintle pin into the further orifice of the landing gear assembly.

The method preferably further comprises removing the pintle support from the landing gear assembly, so as to provide the pintle support for use with another landing gear assembly to be installed at an aircraft. The various elements of the method may be performed in any appropriate order.

The landing gear assembly may be any appropriate type of landing gear assembly, for example a main landing gear (MLG) assembly, nose landing gear assembly or other type of landing gear assembly. The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figures 1A, 1B:
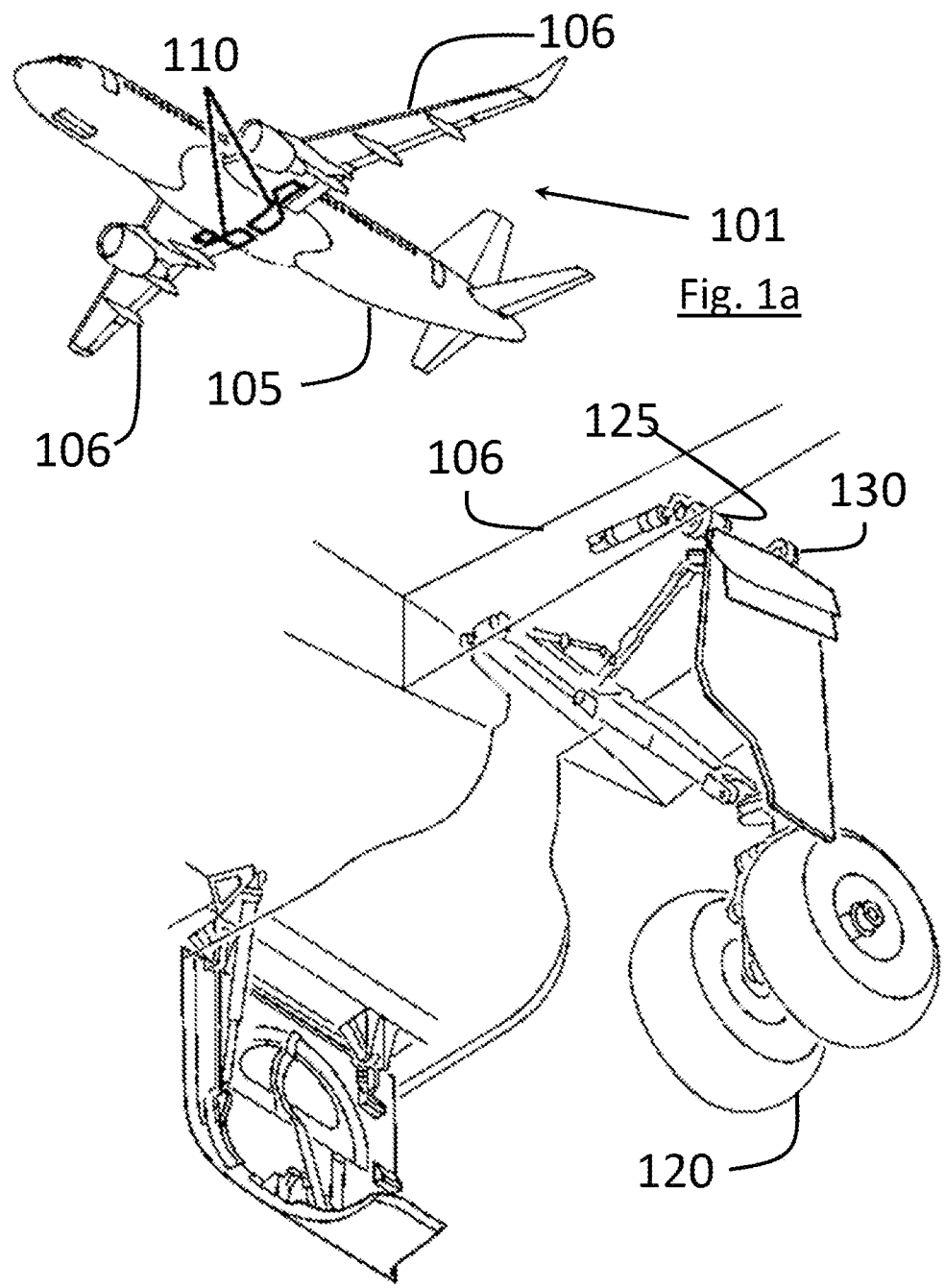
FIGS. 1a and 1b show a prior art arrangement of an aircraft with retractable landing gear.

FIG. 1a shows an aircraft 101 comprising a fuselage 105 and a pair of wings 106. The aircraft 101 also includes sets of landing gear door components 110, which provide a contiguous covering at the underside of the fuselage 105 and the pair of wings 106 for main landing gear assemblies (not shown) when in a retracted configuration.

Referring now also to FIG. 1b, a portion of the aircraft 101 is depicted with the left (port) side of the landing gear door components 110 of FIG. 1a shown in greater detail, now in an extended (deployed) position. A main landing gear, or MLG 120 of the aircraft 101 is pivotally coupled to the wing 106 via pintles 125 and 130, such during extension and retraction, the MLG 120 pivots on forward and aft pintle bearings 125 and 130 respectively.

Figure 2:
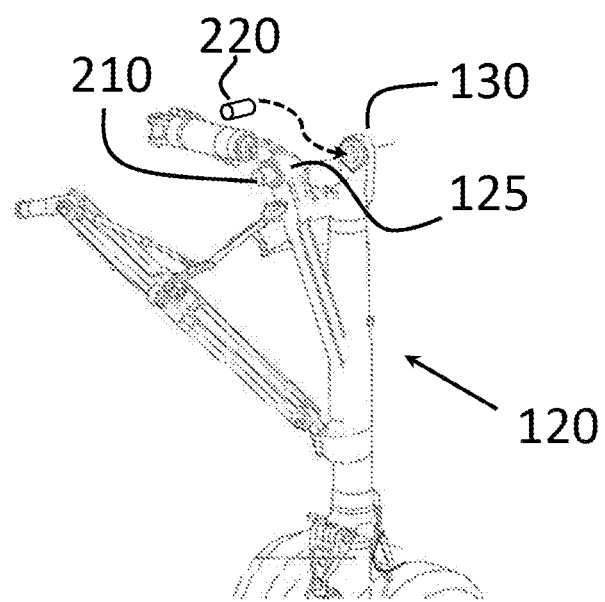
FIG. 2 shows in further detail the prior art landing gear assembly of FIG. 1.

FIG. 2 shows the MLG 120 with a forward pintle pin 210 already attached to the forward pintle bearing 125. An aft pintle pin 220 is ready to be fitted to the aft pintle bearing 130 when the MLG 120 is in position and correctly aligned with the airframe.

Figure 3A:
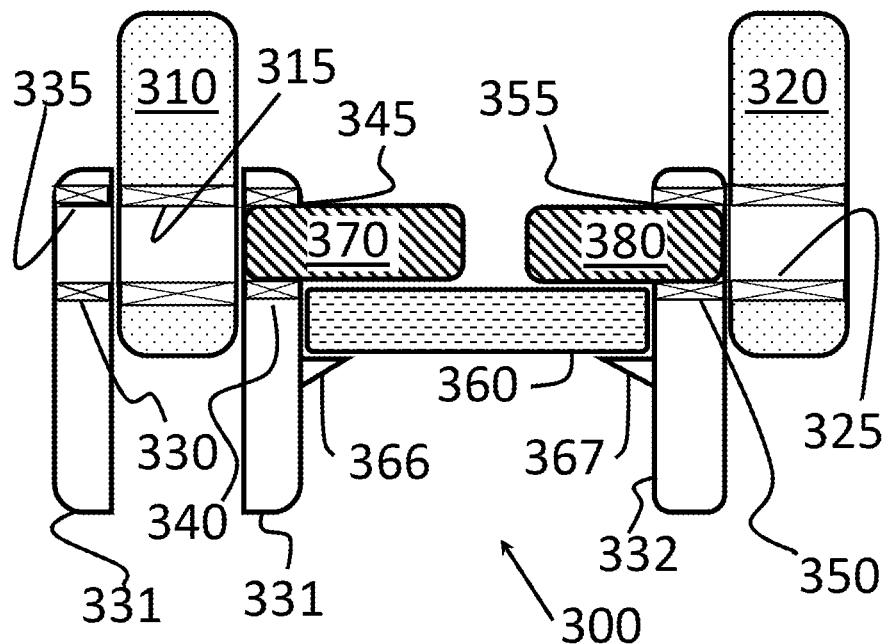
FIGS. 3a and 3b show a landing gear assembly with a pintle support according to a first embodiment of the disclosure herein.
Figure 3B:
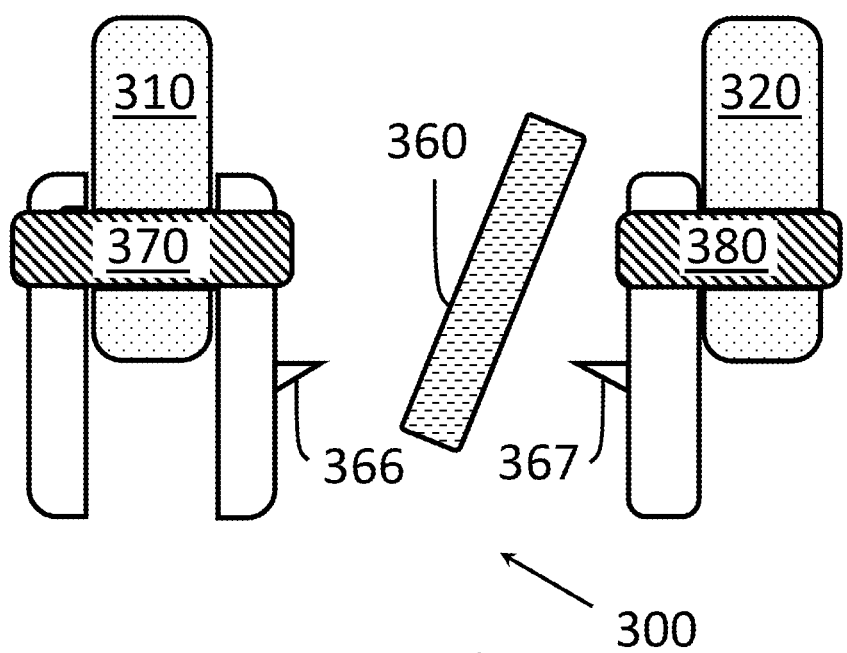

FIGS. 3a and 3b show a landing gear assembly with a pintle support according to an embodiment. An upper portion of a MLG 300 is shown together with corresponding first and second locations 310 and 320 respectively of the aircraft 101, to which the MLG 300 is to be connected. The first and second locations 310, 320, are structural portions of the aircraft 101, for example gear rib lugs and/or spar fittings. The first location 310 has an orifice 315, for example defined by an inwardly facing surface of a bush or bearing, arranged to receive an aft pintle pin 370 to be further described below. Similarly, the second location 320 has an orifice 325, for example defined by an inwardly facing surface of a bush or by a bearing, such as a spherical bearing, arranged to receive a forward pintle pin 380 to be further described below.

The MLG 300 main leg assembly has an aft prong 331 comprising first and second aft pintle orifices 345, 335. Each aft pintle orifice 345, 335 is defined by a respective inwardly facing surface of a respective first and second aft pintle bush or bearing 340, 330, 340. The aft pintle orifices 345, 335 are respectively arranged to receive the aft pintle pin 370. The MLG 300 main leg assembly also has a forward prong 332 comprising a forward pintle orifice 355 defined by a respective inwardly facing surface of a forward pintle bearing 350. The forward pintle orifice 355 is arranged to receive the forward pintle pin 380. The second aft pintle bush or bearing 330 is fitted in a blind recess of the aft prong 331. The aft and forward prongs 331, 332 of the main leg of the MLG 300 are arranged to be each coupled, via the aft and forward pintle pins 370 and 380 respectively, to the first and second locations 310 and 320 respectively.

A pintle support 360 rests on first and second engagers in the form of first and second support ledges 366, 367. The first and second support ledges 366 and 367 are respectively attached to the aft prong 331 of the leg, below the first aft pintle orifice 345, and to the forward prong 332, below the forward pintle orifice 355.

The pintle support 360 may be made from cardboard, plastics, or any appropriately supportive material. The pintle support 360 is arranged to support the aft and forward pintle pins 370 and 380 when they are only partially inserted in the MLG 300. Specifically, the aft pintle pin 370 is introduced into the first aft pintle orifice 345 of the first aft pintle bearing 340, and the forward pintle pin 380 is introduced into the orifice 355 of the forward pintle bearing 350.

In this way the aft and forward pintle pins 370 and 380 respectively are held in a partially inserted position, as shown in FIG. 3a, with respect to the first aft pintle bearing 340 and the forward pintle bearing 350 respectively, while being supported by the pintle support 360. It will be appreciated that this allows the aft and forward pintle pins 370 to be pre-lubricated and partially fitted to the MLG 300 while being supported by the pintle support 360. The pintle support 360 may have a part cylindrical recess (not shown) extending along its upper surface, forming a cradle in which the pintle pins 370, 380 may be seated. Other pintle support features for stably supporting and protecting the pintle pins 370, 380 while supported by the pintle support 360 will be apparent to the skilled person.

Referring now to FIG. 3b, the upper portion of the MLG 300 is shown once more, this time with the aft and forward pintle pins 370 and 380 being fully fitted. The aft pintle pin 370 now extends through the orifice 345 of the first aft pintle bearing 340, through the orifice 315 of the first location 310 and into the recessed orifice 335 of the second aft pintle bearing 330. Similarly, the forward pintle pin 380 now extends through the orifice 355 of the forward pintle bearing 350 and into the orifice 325 of the second location 320.

With the aft and forward pintle pins 370 and 380 respectively being fully fitted, the temporary pintle support 360 may be removed, after which it may be re-used with another MLG.

Figure 4:
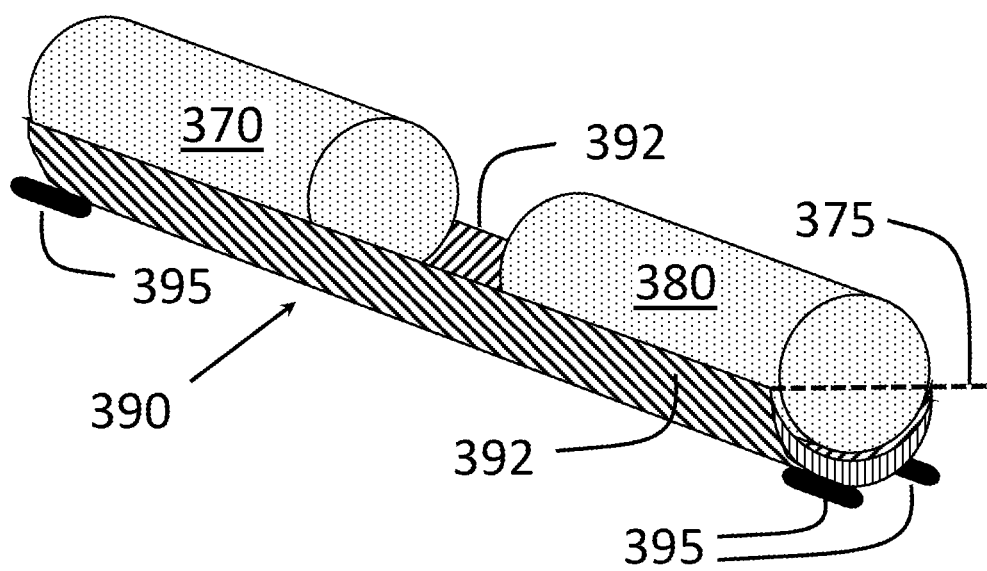
FIG. 4 shows a pintle support according to a second embodiment of the disclosure herein.

Referring now to FIG. 4, an alternative arrangement is shown having an alternative pintle support 390. The pintle support 390 has sidewalls 392 which are arranged to extend around the sides of the aft and forward pintle pins 370 and 380, up to approximately half their respective heights (as shown by broken line 375).

The pintle support 390 also has two retractable fixing lugs 395, disposed at each respective end of the pintle support 390. In this alternative arrangement, the first and second support ledges 366, 367 are replaced by recesses (not shown) in the aft prong 331 and the forward prong 332 respectively. The recesses coordinate with the retractable fixing lugs 395 in order to fix the pintle support 390 in place, in a location similar to that of the pintle support 360 shown in FIG. 3.

Figure 5:
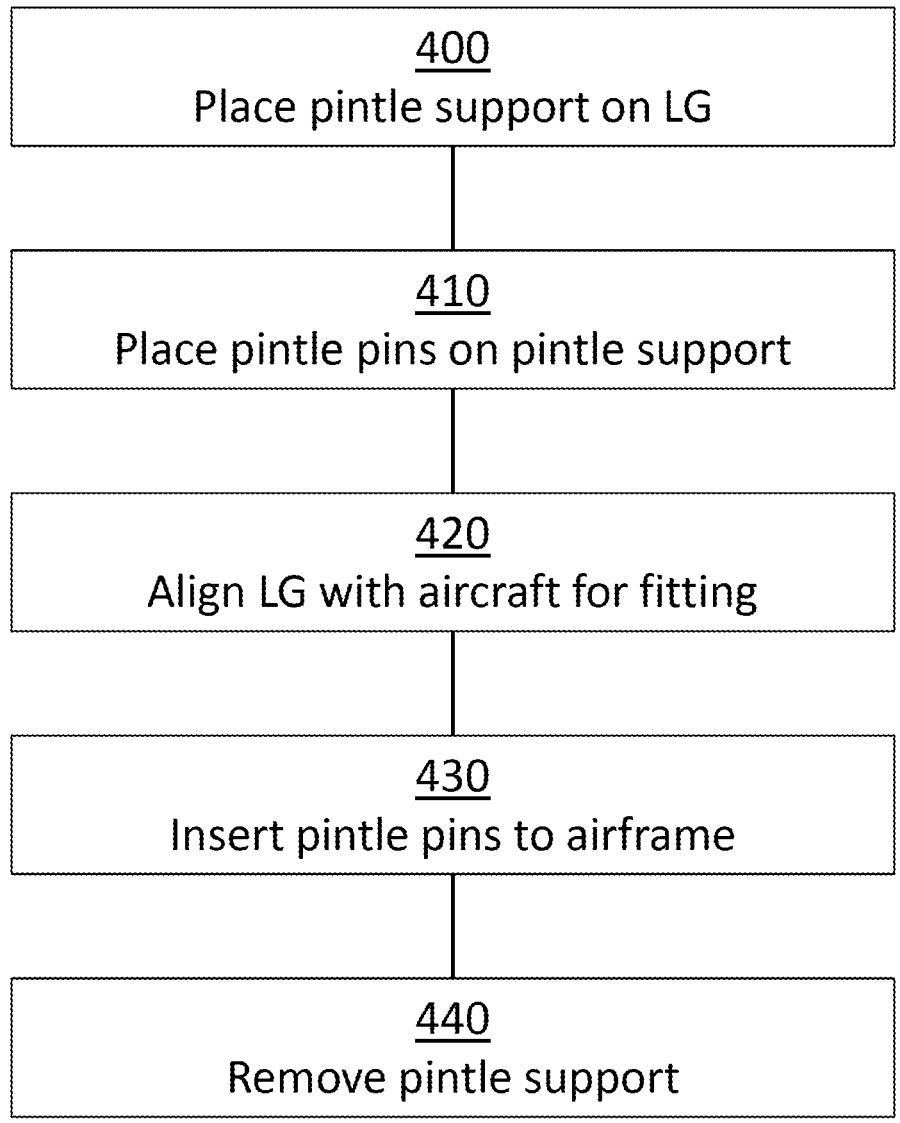
FIG. 5 is a flow diagram illustrating a method of installing a MLG on an aircraft, in accordance with a further embodiment of the disclosure herein.

In operation, and referring now also to FIG. 5, a method of fitting a MLG in accordance with an example of the disclosure herein will now be described.

Firstly, as depicted in box 400, the pintle support 360 is fitted to the MLG 300, by placing it on the first and second support ledges 366, 367. In the alternative arrangement the pintle support 395 is fitted to the MLG 300 by locating the two retractable fixing lugs 395 at each end of the pintle support into their coordinating recesses in the first aft pintle bearing 340 and the forward pintle bearing 350 respectively.

Then, as depicted at box 410, the aft and forward pintle pins 370 and 380 respectively are placed on the pintle support 360 (or pintle support 390), with one end of each respective pintle pin being held in a partially inserted position with respect to the first aft pintle bearing 340 and the forward pintle bearing 350 respectively. Each of the aft and forward pintle pins 370 and 380 respectively will have been prepared (for example having been cleaned and greased) prior to being placed on the pintle support 360.

Alternatively, the aft and forward pintle pins 370 and 380 respectively may be placed on the pintle support 360 (or pintle support 390), prior to the latter being fitted to the MLG 300. In this case the aft and forward pintle pins 370 and 380 respectively will, when first placed, be contained entirely within the contours of the pintle support 360 (or pintle support 390). Once the pintle support 360 is fitted to the MLG 300, the aft and forward pintle pins 370 and 380 respectively may then be moved outwards to be partially inserted into the first aft pintle bearing 340 and the forward pintle bearing 350 respectively.

The MLG 300 is then aligned with the aircraft 101 for fitting, as depicted in box 420. This may be undertaken by mounting the MLG 300 on a jig or lifting device (not shown), or by hoisting it up towards the aircraft via a hoist (not shown).

Once aligned, the aft and forward pintle pins 370 and 380 respectively are fully inserted into their respective orifices as depicted in box 430. The aft pintle pin 370 extends through the orifice 345 of the first rear pintle bearing 340 and through the orifice 315 of the first location 310 and into the orifice 335 of the second rear pintle bearing 330. Similarly, the forward pintle pin 380 extends through the orifice 355 of the forward pintle bearing 350 and into the orifice 325 of the second location 320.

Now that the aft and forward pintle pins 370 and 380 respectively have been fully inserted, the pintle support 360 (or pintle support 390), is removed from the MLG 300, as depicted at box 440.

Finally, the MLG 300 may be retracted and extended for testing and adjustment purposes.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

It will be appreciated that the pintle support 300 or the pintle support 390 may differ in dimension and shape from those described above. For example, the pintle support 390 may have a substantially cylindrical profile which extends over more than 50% of the surface of the aft and forward pintle pins 370 and 380 respectively.

Furthermore, the first and second support ledges 366, 367 may be temporary fixtures, which may be removed from the aft prong 331 and the forward prong 332 respectively after removal of the pintle support 300.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

It should be understood that modifications, substitutions, and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A removable pintle support configured to engage with a landing gear assembly, to be supported by the landing gear assembly, and to support at least one pintle pin in a predetermined position with respect to at least one orifice of the landing gear assembly during installation of the landing gear assembly to an aircraft.

2. The pintle support of claim 1, wherein the predetermined position is adjacent at least one orifice of the landing gear assembly, and wherein the pintle support is configured to support the at least one pintle pin in alignment with the at least one orifice.

3. The pintle support of claim 2, wherein the pintle support is configured to support the or each pintle pin for insertion into, and or with at least one of the pins partially inserted in, the or each respective orifice, with the pintle support engaged with the landing gear assembly.

4. The pintle support of claim 1, wherein the pintle support is configured to support forward and aft pintle pins in alignment with forward and aft orifices of the landing gear assembly respectively.

5. The pintle support of claim 4, wherein the pintle support is configured to be engaged with the landing gear assembly between the forward and aft orifices of the landing gear assembly.

6. The pintle support of claim 5, wherein the pintle support is configured to support the forward and or aft pintle pins for insertion into, and or with at least one of the pins partially inserted in, the forward and or aft orifices respectively, with the pintle support engaged with the landing gear assembly.

7. The pintle support of claim 1, wherein the pintle support is fabricated from one of cardboard and plastics material.

8. The pintle support of claim 1, wherein the pintle support is shaped to cradle the or each respective pintle pin, to thereby provide positional stability and or protection from contamination and surface damage.

9. A landing gear assembly configured to engage with and support a removable pintle support in a predetermined position relative to the landing gear assembly, thereby supporting at least one pintle pin in a predetermined position with respect to at least one pintle orifice of the landing gear assembly.

10. The landing gear assembly of claim 9, wherein the landing gear assembly includes an engager comprising at least one protruding member configured to engage and support the pintle support in its predetermined position, thereby to support the or each pintle pin in alignment with the or each respective pintle orifice.

11. The landing gear assembly of claim 9, wherein the landing gear assembly includes an engager comprising at least one recess configured to engage and support the pintle support in its predetermined position, thereby to support the or each pintle pin in alignment with the or each respective pintle orifice.

12. A method of installing a landing gear assembly at an aircraft, the method comprising:
engaging a pintle support to the landing gear assembly so that the pintle support is supported by the landing gear assembly in a predetermined position relative to an orifice of the landing gear assembly;
placing a pintle pin on the pintle support, in alignment with the orifice;
positioning the landing gear assembly at a landing gear fixing of the aircraft, with the orifice of the landing gear assembly in alignment with the landing gear fixing;
inserting the pintle pin into the orifice and the landing gear fixing to attach the landing gear assembly to the aircraft; and
after the pintle pin has been fully inserted into the orifice and the landing gear fixing, removing the pintle support from the landing gear assembly.

13. The method of claim 12, further comprising, prior to positioning the landing gear assembly at the landing gear fixing of the aircraft, inserting the pintle pin into the orifice of the landing gear assembly.

14. The method of claim 12, further comprising:
engaging the pintle support to the landing gear assembly so that the pintle support is supported in a predetermined position relative to a further orifice of the landing gear assembly;
placing a further pintle pin on the pintle support in alignment with the further orifice;
positioning the landing gear assembly at a landing gear fixing of the aircraft with both the orifice and the further orifice of the landing gear assembly in alignment with the landing gear fixing; and
inserting the pintle pin and the further pintle pin into the orifice and the further orifice respectively, and into the landing gear fixing, to attach the landing gear assembly to the aircraft.

15. The method of claim 14, further comprising, prior to positioning the landing gear assembly at the landing gear fixing of the aircraft, inserting the further pintle pin into the further orifice of the landing gear assembly.

16. The method of claim 12, further comprising removing the pintle support from the landing gear assembly, and providing the pintle support for use with another landing gear assembly to be installed at an aircraft.

* * * * *